A. JACKSON & F. C. DRESCHER.
VALVE.
APPLICATION FILED AUG. 24, 1914.
1,126,766.
Patented Feb. 2, 1915.
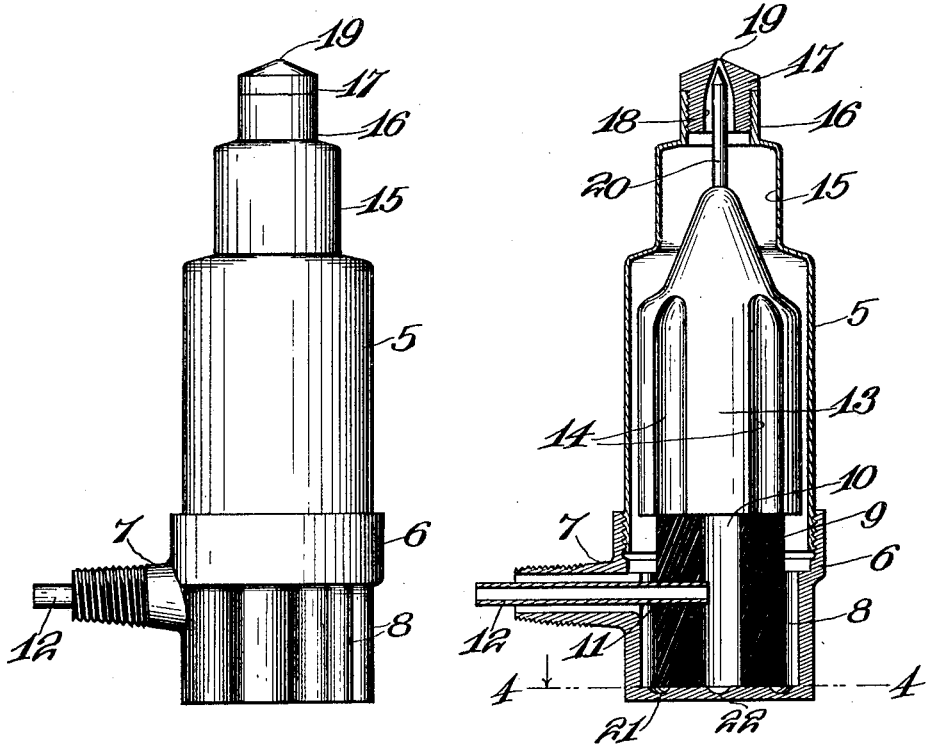
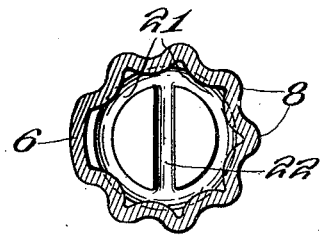
Fig. 3.
Andrew Jackson
and Frank C. Drescher
INVENTORS.
WITNESSES:
BY
ATTORNEYS.

UNITED STATES PATENT OFFICE.

ANDREW JACKSON AND FRANK C. DRESCHER, OF CHICAGO, ILLINOIS.

VALVE.

1,126,766.  Specification of Letters Patent.  Patented Feb. 2, 1915.

Application filed August 24, 1914. Serial No. 858,341.

*To all whom it may concern:*

Be it known that we, ANDREW JACKSON and FRANK C. DRESCHER, citizens of the United States, residing at Chicago, in the county of Cook and State of Illinois, have invented certain new and useful Improvements in Valves, of which the following is a specification.

This invention relates to valves for controlling the escape of air from steam radiators and its object is to provide a simple and efficient valve which effectually prevents the escape of water to the outside thereof.

A further object of the invention is to provide a heat controlled means which prevents the escape of steam from the radiator.

A further object of the invention is to provide a means whereby water which has filled the valve from the flooding of the radiator may be quickly drained therefrom when water in the radiator recedes to the boiler.

With these objects in view, reference is had to the accompanying drawing, in which—

Figure 1 is an elevation of the valve; Fig. 2 is a central vertical section thereof, and Fig. 3 is a horizontal section thereof taken on line 4—4 of Fig. 2.

Referring more particularly to the drawing, 5 denotes a float chamber which is screwed or otherwise connected at the bottom to an inlet nipple 6, which latter, in turn, is connected to the radiator (not shown) by means of a tubular connection 7. The nipple is cylindrical in form and its walls are corrugated vertically as shown at 8. Within the nipple is seated a cylindrical member 9 which is made of hard rubber or similar substance which expands to a required extent when in contact with steam and is not subject to corrosion from water or steam. Said member 9 has a vertical central bore 10 and a smaller horizontal bore 11 in the side facing the inlet connection 7. In the latter, and positioned centrally thereof, is a narrow tube 12, whose outer end extends slightly beyond the outer end of the connection 7 and whose inner end is snugly held in the bore 11 and communicates with the vertical bore 10 of the member 9.

In the chamber 5 is mounted a hollow metal float 13 which normally seats on the member 9, thus forming a closure for the upper end of the bore 10. The sides of the float are fluted, as shown at 14, to allow more space for air or steam in the float chamber 5. The latter is slightly reduced in width above the float, as shown at 15, and terminates in a short neck 16. The neck is internally threaded to receive a plug 17, which has a central bore 18 tapering to an outlet aperture 19 at the outer end of the plug. The top of the float 13 is conical and has an upwardly projecting needle valve 20, which enters the bore 18 of the plug 17 and is adapted to control the outlet aperture 19.

The bottom of the nipple 6 is flat and has a circular groove 21 in its inner face, said groove also having a straight intermediate portion 22 located on a diametrical line.

In operation, steam entering the radiator first crowds the air out through the valve. Hence, the passage of the air through the valve will not be obstructed, as the air will enter the nipple 6, rise about the float 13 and escape through outlet aperture 19. As soon as steam begins to enter the valve, however, it will act upon the member 9 coming into contact with more of its exterior surface by way of the internal grooves formed by the corrugations 8 of the nipple walls; the steam will also enter the bore 10 by way of the tube 12 and bottom grooves 21 and 22. Thus, with a large portion of its surface exposed to the steam, the member 9 will expand from the heat and will lift the float 13 sufficiently to enable the needle valve 20 to close the outlet aperture 19. This will stop further outflow of steam. If the radiator becomes flooded at any time and water collects in the float chamber 5, the float 13 will rise and close the valve 20, thereby preventing water from flowing out through the outlet aperture 19 into the room. When the water recedes from the radiator to the boiler, water in the valve should also recede; but, as the float 13, of its buoyancy, keeps the valve 20 closed, no air enters through aperture 19 to relieve the vacuum formed by the falling of the water in the float chamber 5. However, air from the radiator will enter the nipple through the connection 7 while the bore 10 and tube 12 still contain water, and rise in the chamber 5. The chamber 5 will now become filled with air, the water falling and flowing into the radiator through tube 12. A small amount of water will necessarily remain in the nipple, but a fresh supply of steam will quickly boil it out.

We claim:

1. An air vent valve for radiators comprising a float chamber having an inlet, and an outlet provided with an escape port, the bottom of the float chamber having intercommunicating grooves, a hollow expansible member mounted on the grooved bottom of the chamber, the grooves establishing communication between the interior of the expansible member and the float chamber, a float subject to the influence of said member, and a valve carried by the float, said valve controlling the aforesaid escape port.

2. An air vent valve for radiators comprising a float chamber having an inlet, and an outlet provided with an escape port, an expansible member located on the bottom of the chamber, said member having a central longitudinal aperture, and a lateral branch aperture leading therefrom, a conduit extending from the inlet and passing through the lateral aperture and opening into the longitudinal aperture, a float subject to the influence of the expansible member, and a valve carried by the float, said valve controlling the aforesaid escape port.

3. An air vent for radiators comprising a float chamber having an inlet, and an outlet provided with an escape port, the bottom of the float chamber having intercommunicating grooves, a hollow expansible member mounted on the grooved bottom of the chamber, the grooves establishing communication between the interior of the expansible member and the float chamber, a conduit extending from the inlet and passing through the expansible member to the interior thereof, a float subject to the influence of the expansible member, and a valve carried by the float, said valve controlling the aforesaid escape port.

In testimony whereof we affix our signatures in presence of two witnesses.

ANDREW JACKSON.
FRANK C. DRESCHER.

Witnesses:
  S. J. LEHRER,
  H. G. BATCHELOR.

Copies of this patent may be obtained for five cents each, by addressing the "Commissioner of Patents, Washington, D. C."